(12) United States Patent
Rether

(10) Patent No.: US 12,291,994 B2
(45) Date of Patent: May 6, 2025

(54) POWER PLANT SYSTEM AND METHOD OF OPERATING THE SAME

(71) Applicant: Siemens Energy Global GmbH & Co. KG, Bayern (DE)

(72) Inventor: Tobias Rether, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/769,401

(22) PCT Filed: Oct. 23, 2020

(86) PCT No.: PCT/EP2020/079844
§ 371 (c)(1),
(2) Date: Apr. 15, 2022

(87) PCT Pub. No.: WO2021/078919
PCT Pub. Date: Apr. 29, 2021

(65) Prior Publication Data
US 2024/0125269 A1    Apr. 18, 2024

(30) Foreign Application Priority Data
Oct. 24, 2019  (EP) .................................... 19205050

(51) Int. Cl.
*F02C 6/18*    (2006.01)
*F02C 3/34*    (2006.01)
(Continued)

(52) U.S. Cl.
CPC .................. *F02C 3/34* (2013.01); *F02C 6/18* (2013.01); *H01M 8/0618* (2013.01); *H01M 2008/1293* (2013.01)

(58) Field of Classification Search
CPC ........... F02C 3/34; F02C 6/18; H01M 8/0618; H01M 2008/1293
See application file for complete search history.

(56) References Cited

U.S. PATENT DOCUMENTS

| 5,413,879 A | 5/1995 | Domeracki et al. |
| 2004/0191595 A1* | 9/2004 | McElroy ............ H01M 8/04119 429/495 |

(Continued)

FOREIGN PATENT DOCUMENTS

WO    9827004 A1    6/1998

OTHER PUBLICATIONS

PCT International Search Report and Written Opinion of International Searching Authority mailed Feb. 16, 2021 1 corresponding to PCT International Application No. PCT/EP2020/079844 filed Oct. 23, 2020.

*Primary Examiner* — Todd E Manahan
*Assistant Examiner* — Rodolphe Andre Chabreyrie
(74) *Attorney, Agent, or Firm* — Wolter Van Dyke Davis, PLLC

(57) ABSTRACT

Power plant system and method of operating the same, the power plant system having a solid oxide fuel cell and a gas turbine, wherein the fuel cell and the gas turbine are set up such that compressed charge air of a compressor of the gas turbine can be provided to the fuel cell and/or an exhaust gas of the fuel cell can be provided to a combustion chamber of the gas turbine, wherein the system is configured such that the solid oxide fuel cell can be operated in a cell mode as well as in an electrolysis mode and wherein the solid oxide fuel cell is set up such that an excess grid energy is used for executing an electrolysis in the electrolysis mode of the fuel cell and thereby to chemically reduce water and/or carbon dioxide into hydrogen and/or syngas.

9 Claims, 7 Drawing Sheets

(51) Int. Cl.
H01M 8/0612 (2016.01)
H01M 8/12 (2016.01)

(56) References Cited

U.S. PATENT DOCUMENTS

2005/0048334 A1 3/2005 Sridhar et al.
2008/0314741 A1* 12/2008 Balestrino ............... C25B 15/08
 204/274
2021/0143645 A1* 5/2021 Uechi ..................... H02P 27/06

* cited by examiner

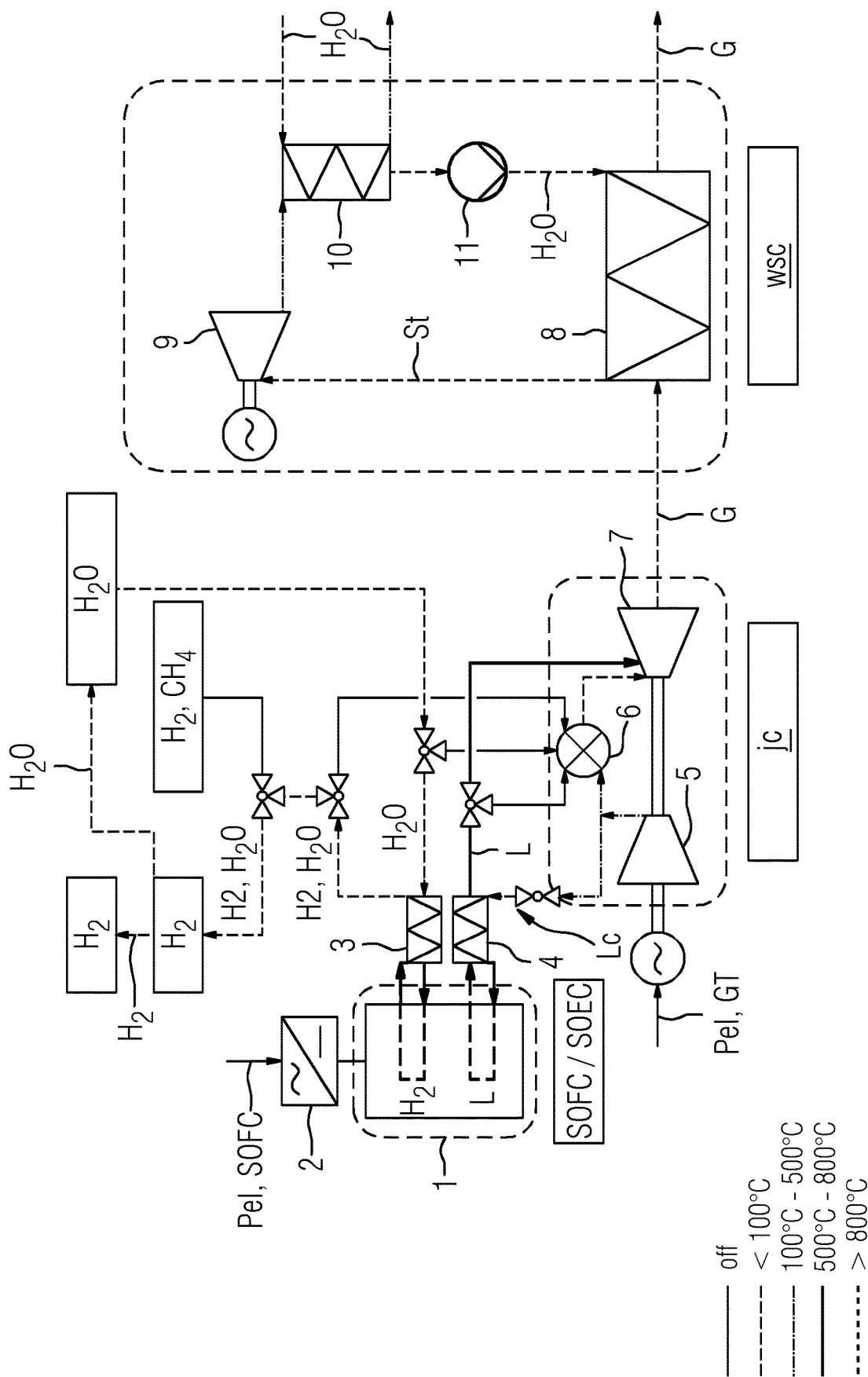

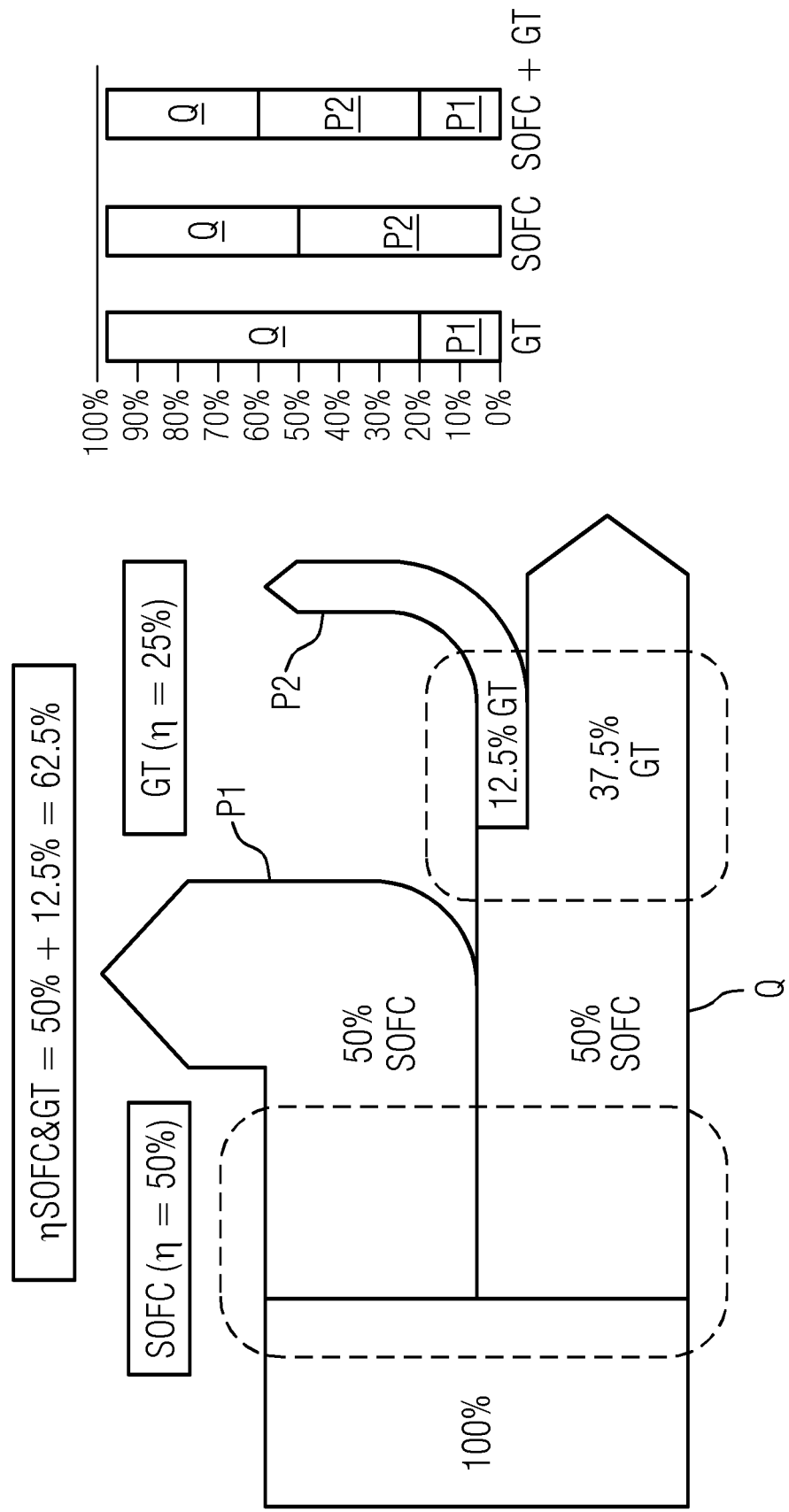

POWER PLANT SYSTEM AND METHOD OF OPERATING THE SAME

CROSS REFERENCE TO RELATED APPLICATIONS

This application is the US National Stage of International Application No. PCT/EP2020/079844 filed 23 Oct. 2020, and claims the benefit thereof. The International Application claims the benefit of European Application No. EP19205050 filed 24 Oct. 2019. All of the applications are incorporated by reference herein in their entirety.

FIELD OF INVENTION

The present invention relates to a power plant system comprising a gas turbine and a solid oxide fuel cell being coupled to said gas turbine. The solid oxide fuel cell can e.g. be operated in a load or cell mode as well as in an electrolysis mode. In other words, the solid oxide fuel cell is expediently set up to run as well in a regenerated mode, such as in order to perform water and/or carbon dioxide electrolysis.

Further, the invention relates to a method of operating said power plant system.

BACKGROUND OF INVENTION

Solid oxide fuel cell (SOFC) systems are e.g. known from patent EP 2 956 981 B1, wherein an operational mode of said fuel cell as well as an application in energy storage is described.

The general function of an SOFC or as the case may be an SOEC (Solid Oxide Electrolyser Cell), i.e. an SOFC operated in the regenerative mode, wherein e.g. water, such as in the form of steam, is split into pure $H_2$ and $O_2$ as will be described further below.

Challenges in nowadays energy landscape and related technology development concern flexibilization of energy supply, climate change implications, like the demand of decarbonization, and the need to increase efficiency of power plants and to replace fossil energy sources by renewable ones.

In terms of decentralization there is the need to replace big or centralized grids by smaller or self-sufficient grids. The so-called sector coupling or related technology can e.g. be used to establish a connection between mobility, industry and energy sectors.

Further, a storage of large amounts of renewable energy is required to enable a reliable energy supply in the future energy landscape to cope with inherent fluctuations in (de-centralized) power generation.

A major role in order to approach the given challenges, thus, play Power-to-X solutions and decentralised or micro-energy grids. So-called Power-to-X solutions and related energy conversion or transformation constitute key technologies for the society's future energy landscape. Thereby, flexibility in using different fuels as well as increased efficiency lead to a decrease in $CO_2$ emissions in view of the generated electrical power. The possibility to chemically reduce e.g. carbon dioxide and water into synthesis gas (syngas) e.g. opens up the possibility for a closed energy cycle without emitting unneeded emissions like carbon dioxide $CO_2$. In this regard there is the demand of scalability in order to enable yet a broader field of application from decentralized microgrids up to grids of the macro or industrial scale.

As energy generation, e.g. photovoltaics, wind power or conventional or fossil resources exist, wherein only the fossil resources thereof provide for a constant (non-fluctuating) energy. In order to apply such an energy supply in the mobility sector, industry or further energy conversion, said energy may—once provided—be stored or converted in the form of hydrogen, such as provided by electrolysis, like a PEM electrolysis or other approaches. Moreover, these resources can be used for methane or carbon dioxide production.

Solid oxide fuel cells (SOFC's) e.g. as well feature e.g. capability of oxidizing carbon and hydrogen to carbon dioxide and water by generation of or providing electrical energy. This may relate or mean a direct conversion of chemical energy to electrical energy. Regularly, SOFCs comprise an electrolyte of a solid oxide ceramic, e.g. of or comprising zirconium and/or yttrium dioxide, or $Zr(Y)O_2$ and anode gases, such as hydrogen, methane, natural gas or coal gas. Further, SOFCs have operating temperatures of roughly between 800° C. and 1000° C.

An efficiency, such as an energy conversion or power generation efficiency of an SOFC system may amount to 50% in an SOFC mode of operation. A further advantage of an SOFC as applied in the presented solution is inter alia that no reforming of fuels is required anymore.

In US 2003/0054210 A1 a fuel cell generator apparatus is described comprising at least one fuel cell assembly module containing a plurality of fuel cells, each fuel cell having an electrolyte between an air electrode and a fuel electrode, a module housing enclosing the module, a pressure vessel having two ends surrounding the module housing, such that there is an air accumulation space between the module housing and the pressure vessel, wherein the pressure vessel has a fuel gas inlet tubing connecting to a module fuel gas inlet and inter alia—an air compressor associated with a gas turbine generator system for supplying compressed air.

SUMMARY OF INVENTION

An object of the present invention is to provide an improved solution for the given technical issues as listed in. This object is achieved by the subject-matters of the independent claims. Advantageous embodiments are subject-matter of the dependent claims.

An aspect of the present invention relates to a power plant system comprising a solid oxide fuel cell and a gas turbine, wherein the fuel cell and the gas turbine are set up or functionally coupled such that compressed charge air of a compressor of the gas turbine can be provided to the fuel cell and/or an exhaust gas of the fuel cell can be provided to a combustion chamber of the gas turbine, wherein the system is configured such that the solid oxide fuel cell can be operated in a load or cell mode as well as in an electrolysis mode and, wherein the solid oxide fuel cell is set up such that an excess grid energy is used for executing an electrolysis in the electrolysis mode of the fuel cell and thereby to chemically reduce e.g. water and/or carbon dioxide into hydrogen and/or syngas.

As an advantage of the solution presented herein, a solid oxide fuel cell and gas turbine interaction or combination particularly feature the possibility to reduce start-up time of the associated gas turbine, e.g. to compensate parts of the start-up operation by the functional coupling of the SOFC and the presented solutions. As a synergetic effect, an elevated temperature level—as is required for an efficient SOFC operation—may be inherently provided by the functional coupling of the gas turbine in the presented setup.

Moreover, by the presented means, a fuel cell efficiency can be increased when operated at conditions or pressures of the gas turbine compressor discharge level.

Moreover, unburned fuel in an exhaust gas of the fuel cell can advantageously be used for energy generation in the gas turbine combustion cycle, and therewith contribute to the working fluid.

Therewith, in addition, the presented solution allows for compensating of grid fluctuations at high efficiency. Furthermore, there is the potential to compensate for scaling effects of gas turbines by combining this technology with that one of solid oxide fuel cells. Particularly, a loss in gas turbine efficiency at a small scale may advantageously be compensated for by the fuel cell operation in the presented "hybrid" system and therewith a "stabilization" element of micro grids is presented.

In an embodiment, the power plant system comprises a steam turbine or steam turbine unit being functionally coupled to the gas turbine such that a "combined-cycle" plant operation is facilitated. Particularly, the presented solution is applicable to these combined cycle approaches so that the efficiency benefit of combined-cycle power plants can be exploited, and an according overall efficiency increase be achieved.

An increase of the electrical efficiency of up to 10% by a combination of an energy conversion concept applying thermodynamic cycles and as well galvanic principles is particularly possible including exploitation of heat of a turbo machine, such as a gas turbine.

A further aspect of the present invention relates to a method of operating a power plant system as described above. In this method, the solid oxide fuel cell is operated in a load or cell mode or, alternatively, in an electrolysis mode or regenerated mode. Consequently, the presented plant system can be operated in a versatile way and in both operating modes. Therewith, the system is adapted to the mentioned demands in the energy supply landscape and can, thus, provide for the mentioned advantages and cope with the demands of grid flexibilisation and decarbonisation.

Particularly, the field of application of conventional gas turbine technology in terms of efficiency, field of operation and emissions is increased at all scales by the presented approach. For instance, a low efficiency of small (industrial) gas turbines and compensation of the inertness of large (power plant) gas turbines may be compensated for by the integration of the fuel cell technology as described herein. In other words a combination of an electricity generating technology and fuel generating technology may be achieved. Due to the good scalability, furthermore an implementation on a decentralised scale as well as in a macro-industrial scale is possible.

Specifically, the regenerative mode of the fuel cell allows for an efficient electrolytic reduction of carbon dioxide and/or water and therewith to provide for a Power-to-X solutions along with its merits.

In an embodiment an excess grid energy is used for executing an electrolysis in the electrolysis mode of the fuel cell and thereby to chemically reduce water and/or carbon dioxide into hydrogen and syngas. As an advantage thereof, on one side superfluous grid energy can be taken off or consumed. Also, such energy can be used in a sustainable way to provide fuels or other (hydro-carbon-based) products, such as for storage applications and/or further industrial application.

In an embodiment the solid oxide fuel cell is operated in an ambient of compressed charge air being generated by a compressor of the gas turbine. In this way, the above-mentioned advantages can be exploited.

A compressor of a gas turbine allows to provide a charging pressure to the fuel cell during load and electrolysis operation in order to increase performance. Exhaust or flue gases of the fuel cell may in addition be expanded in the turbine section in order to reduce the necessary driving power of the compressor (via the generator) or—in case of excess energy—to use this for an increased electrolysis yield. By the use of a reversible operating fuel cell which is integrated into conventional power plant technology, said plant may convert chemical energy into electric energy. Further, an excess of electrical energy can be advantageously converted into chemical energy in form of the according fuels. This provides for significant synergy effects and progress in the development of the related technological fields.

In an embodiment, an exhaust gas of the fuel cell still containing a fuel is provided to the combustion chamber of the gas turbine. In this way, the above-mentioned advantages can be exploited. In other words, this provides for an advantageous reduction of the necessary drive capacity of the compressor, such as via the generator or—in the case of excess grid energy—to use the same for an increased electrolysis yield.

In an embodiment, the method comprises a Sabatier reaction to be applied to the syngas in order to provide methane. Said methane can, of course, later on be further used as a fuel gas or applied for other purposes.

In an embodiment, waste or excess heat from the Sabatier reaction is used for thermally regulating the solid oxide fuel cell in the relevant service mode. The term "regulating" may mean that said exothermic reaction can advantageously provide for heat necessary to allow for the fuel cell to operate at an expedient thermal level.

Advantages and embodiments relating to the described plant system may as well pertain or be valid with regard to the according method of operation as described.

Further features, expediencies and advantageous embodiments become apparent from the following description of the exemplary embodiments in connection with the Figures.

BRIEF DESCRIPTION OF THE DRAWINGS

FIG. 7 indicates a schematic connection scheme of a combined cycle power plant coupled with a solid oxide fuel cell system in an electrolysis mode.

FIG. 8 indicates a schematic flow chart energy conversion efficiency levels of a solid oxide fuel cell and, subsequently, a gas turbine in a simple cycle.

DETAILED DESCRIPTION OF INVENTION

Figure 1:
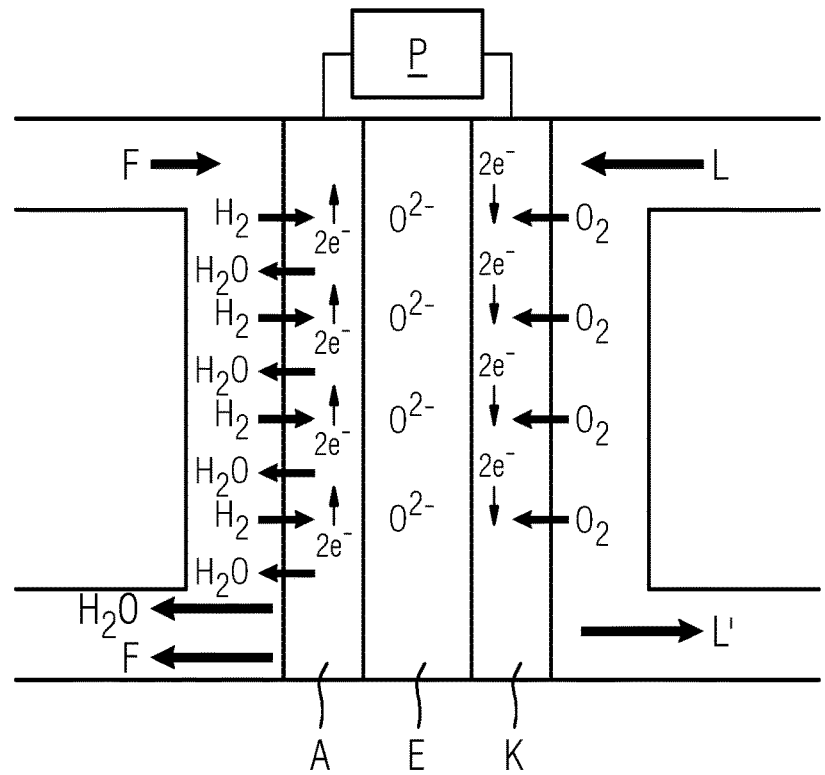
FIG. 1 indicates in a schematic basic functional principle is of a solid oxide fuel cell.

Like elements, elements of the same kind and identically acting elements may be provided with the same reference numerals in the Figures. The Figures are not necessarily depicted true to scale and may be scaled up or down to allow for a better understanding of the illustrated principles. Rather, the described Figures are to be construed in a broad sense and as a qualitative base which allows a person skilled in the art to apply the presented teaching in a versatile way.

The term "and/or" as used herein shall mean that each of the listed elements may be taken alone or in conjunction with two or more of further listed elements.

FIG. 1 indicates the basic functional principle of a solid oxide fuel cell (SOFC), inter alia indicating the general building blocks of an SOFC and a fuel, such as hydrogen, and an air supply.

Fuel cells in general are distinguished by their electrolyte material E. The solid oxide cells feature solid oxide or ceramic electrolytes. Advantages of such fuel cells include a high heat and power efficiency, long-term durability and fuel versatility. As well, there is a relatively low cost at only very poor or negligible environmental and flue emissions. A supposed disadvantage is the high operating temperature which results in longer start-up times and mechanical and chemical compatibility issues. This requirement may, however, be turned into an advantage when contemplating the principles of the present invention. The electrochemical oxidation of hydrogen ($H_2$) as shown in FIG. 1 or carbon monoxide or other organic intermediates (not explicitly shown in the Figures) by oxygen ions, thus, occurs on the anode side.

Usually SOFCs operate at relatively high temperatures, typically between 500 and 1000° C. At these thermal levels, expensive catalyst material may advantageously be dispensed with, whereas such catalysts may be necessary for lower temperature fuel cells such as PEMFCs (Proton Exchange Membrane Fuel Cells).

A solid oxide fuel cell is a galvanic or an electrochemical conversion device that produces electricity (cf. numeral P for electrical power) directly from oxidizing a fuel F, such as hydrogen. Moreover oxygen, such as in form of air L has to be supplied. Then, oxygen ions are generated at a cathode K and conducted via the electrolyte E to the anode A as shown in FIG. 1. The supplied air itself is reduced and thus air L' with a decreased oxygen percentage is discharged.

Figure 2:
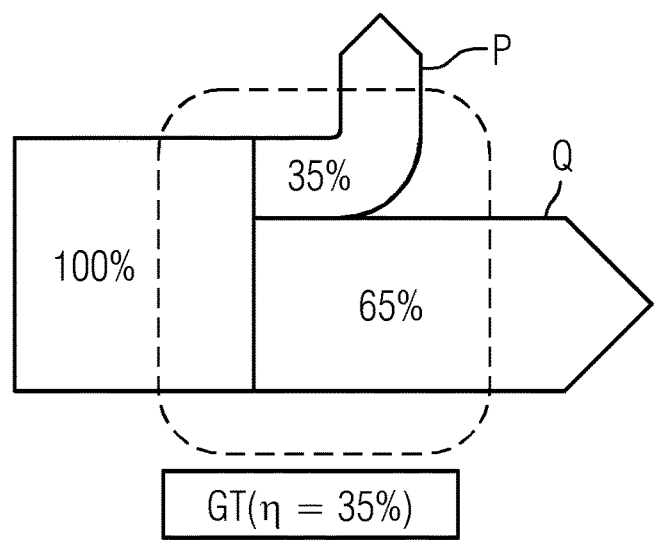
FIG. 2 indicates in a schematic flow chart an energy conversion efficiency level of a gas turbine in a simple cycle.

FIG. 2 indicates a schematic flow chart of a gas turbine's energy conversion efficiency. At the bottom it is indicated that said conversion efficiency η (from thermal to mechanical energy) of conventional gas turbines amounts to about 35%. Consequently roughly 35% of mechanical or electrical power P can be consumed, such as for power generation purposes. A remainder of 65% of the energy dissipates in form of heat Q.

Figure 3:
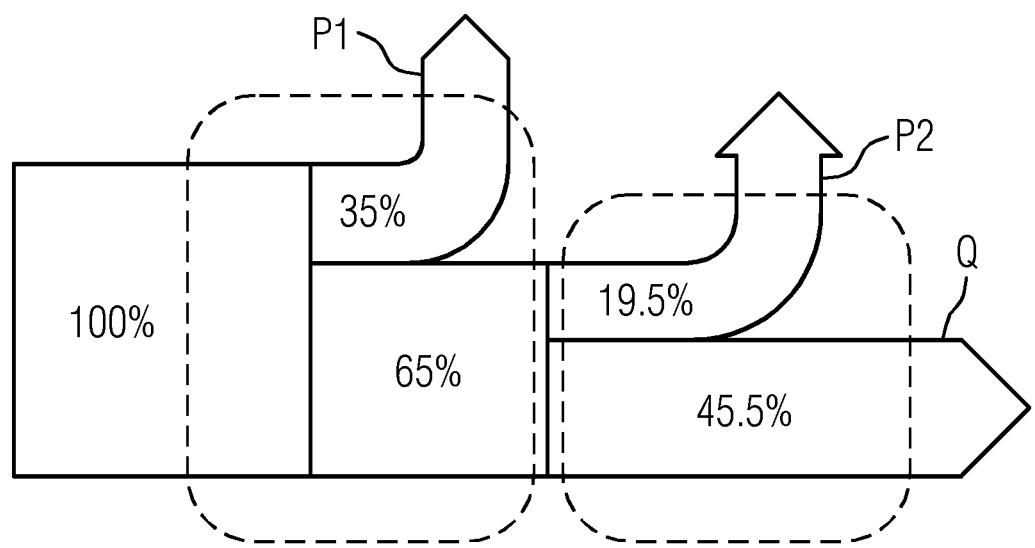
FIG. 3 indicates in a schematic flow chart an energy conversion efficiency level of a gas turbine in a combined cycle operation involving a steam turbine unit.

An example of a scheme of an energy conversion efficiency of a combined-cycle (cc) power plant is shown in the flowchart of FIG. 3. As compared to the situation as shown in FIG. 2, the combined cycle operation allows to increase the overall efficiency η(cc) by roughly 20% to 55% or more, such as 60% in total. This is owed to the conversion of excess heat Q of the gas turbine GT into electric power in the subsequent steam cycle of the steam turbine ST being is coupled to the gas turbine system. It is further apparent that a steam turbine ST may have an individual energy conversion efficiency (from thermal to mechanical energy) of 30%. That one mechanical or electrical power which directly results from the gas turbine operation is denoted by numeral P1, whereas that one conversion which can be ascribed to the steam turbine cycle is denoted by numeral P2.

The present invention now seeks to combine the operation of a solid oxide fuel cell, be it in a cell or electrolysis mode, to be combined with one of the mentioned power plant cycles. Generally, an SOFC is known to be operated at temperatures between 800 and 1000° C., wherein the maximum temperature reached of the hot gas for simple cycle gas turbine is approximately 1500° C. As compared to the conversion efficiency of the gas turbine, an SOFC has usually an efficiency of between 50% and 65% and excels in very low flue emissions as compared to a gas turbine.

A start-up time of a solid oxide fuel cell is further high as compared to a fairly low and advantageous start-up time of the gas turbine. On the contrary, of course emissions of an SOFC are advantageously low as compared to the medium to high emissions of the gas turbine.

By cascading an energy conversion chain in a combined-cycle power plant operation, efficiency can be increased. However, technically, an upper limit of electrical efficiency is foreseeable at around 65%. Probably, efficiencies of conventional plant technology development will converge to this value. A reason for that may be the restriction to Carnot's efficiency as well as the advanced level of development of the underlying technology.

Figure 4:
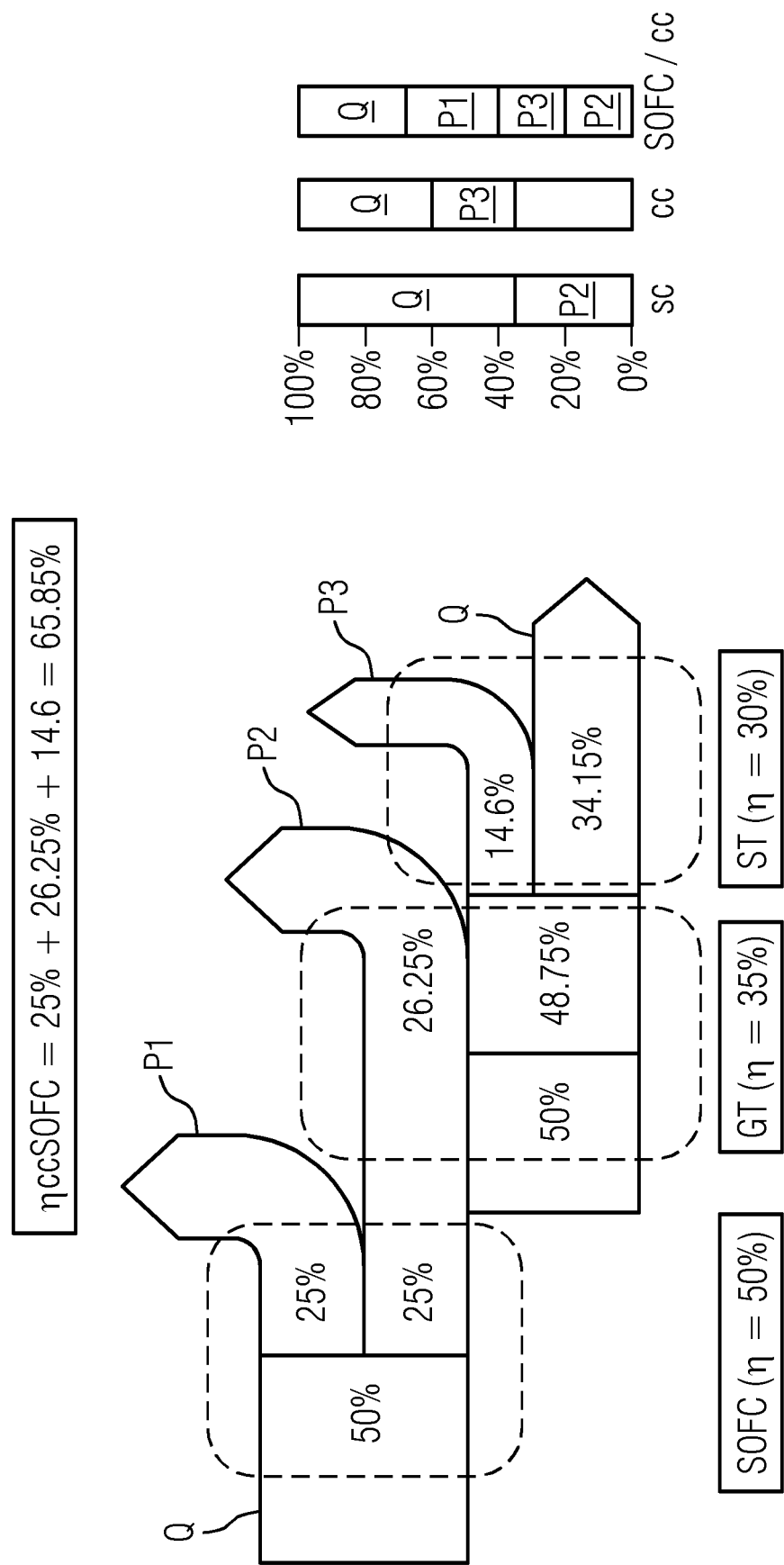
FIG. 4 indicates in a schematic flow chart energy conversion efficiency levels of a solid oxide fuel cell and, subsequently, a gas turbine, in a combined cycle mode as according to an embodiment of the present invention.

As compared to FIGS. 2 and 3, FIG. 4 schematically indicates (on the left) an SOFCs "cycle" indicating an energy conversion efficiency of approximately 50%.

With regard to the fuel cell cycle, an electrical power P1 is supplied by the SOFC (cf. also reference numeral 1 below). Around half of the output, i.e. roughly 25% is heat Q which is further processed in the combined cycle modus. In other words, the (waste) heat of the fuel cell is provided to a gas turbine cycle, such as in that an exhaust flue gas of the fuel cell is provided to a combustion chamber (cf. reference numeral 6 further below) of the gas turbine GT. In turn, said gas turbine cycle may, as indicated (analogue to the indication of FIG. 3) well be coupled to a further steam turbine cycle. This can lead in total to an increased overall energy conversion efficiency of η (SOFC cc) of P1≈25%+P2≈26%+P3=14% which equals to around 66% at this stage already. Apparently, a significant increase in energy conversion efficiency is possible in the described way, wherein at the same time further advantages of the present invention may be exploited (cf. as well FIGS. 7 and 8 below). For instance, the technical advantages of the described "triple"-cycle concept relate to a significantly increased efficiency in an operational SOFC mode, like an increase of 10% to 15%. Further, a lower emission per megawatt by the quasi "cold combustion" process of the SOFC may be achieved. The presented principle stand out for its scalability and its ability to be applied in decentralized grid applications and e.g. for so-called auxiliary power units and in areas with insufficient grid support.

The presented solutions may be further used for new designed power plants as well as retrofits for existing simple and/or combined-cycle power plants to significantly increase efficiency.

Figure 5:
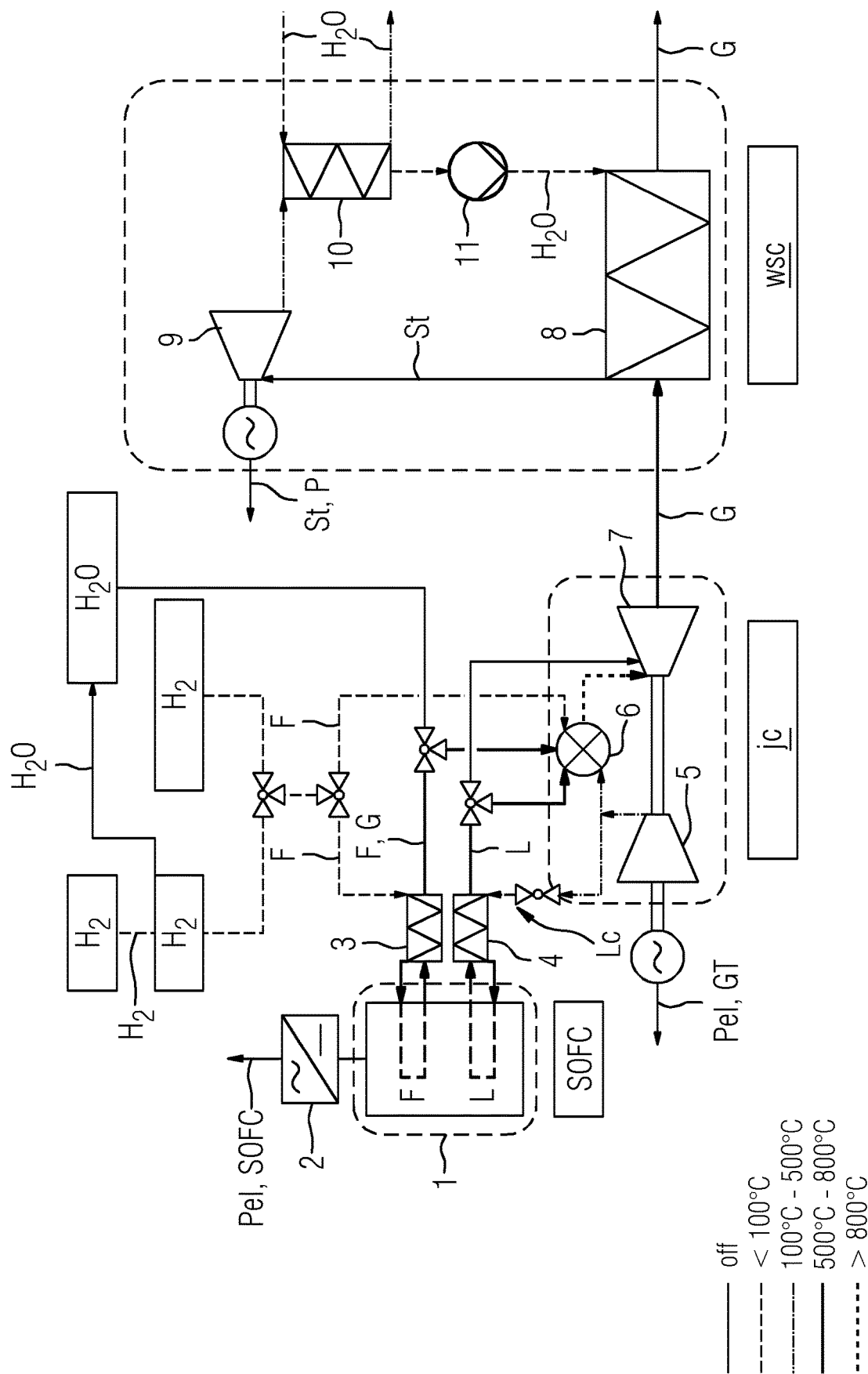
FIG. 5 indicates a schematic connection scheme of a combined cycle power plant coupled with a solid oxide fuel cell system in a load operation.

FIG. 5 indicates a power plant system 100 in a schematic connection scheme showing the system in a combined cycle operation, i.e. coupled with a solid oxide fuel cell in a load operation. On the left, a solid oxide fuel cell 1 in such an SOFC mode is shown. Said fuel cell comprises a supply for air L as well as a supply for a fuel F, such as hydrogen. According to the known principle, said fuel cell is capable of providing an electrical power P or Pel which can be used for power generation purposes in general (cf. upper left part of FIG. 5). Said power output may be converted beforehand, such as by a DC/AC converter 2. A heat exchanger to preheat a fuel for the SOFC is indicated by numeral 3. Moreover, numeral 4 indicates a heat exchanger setup to preheat compressed air of or for the SOFC 1.

Due to the elevated temperature operation of the fuel cell (cf. above), there is a hot air exhaust of the fuel cell operation which may be provided (fluidly coupled via a valve which is not explicitly indicated) to the combustion chamber 6 of a gas turbine GT. Said gas turbine GT further expediently comprises a compressor 5 and a turbine section 7. Expediently said gas turbine GT is capable of performing the known Joule cycle jc.

Likewise, a mixture of a (remaining) fuel F or flue gas G arises which has an elevated temperature level and is therefore beneficial to be provided to the combustion chamber 6 of the gas turbine GT.

The combustion chamber 6 may as shown also be integrated or coupled to a cooling cycle, involving the compressor 5 as well, and a fuel supply as shown in the upper left part of FIG. 5. By the according boxes it shall be indicated e.g. that the plant system 100 may be coupled to the fuel or hydrogen storage which may include an according dryer in order to provide said hydrogen to the fuel cell 1 and potentially also to the combustion chamber 6 of the gas turbine GT as a combustion gas. Moreover, further to the right in the upper part of FIG. 5, a water or H2O supply storage is shown which may be coupled to the cooling cycle of the gas turbine GT.

In addition, the gas turbine GT may be coupled in another manner to the SOFC, namely in that a compressed (charge) air Lc may be provided to the fuel cell 1 as supply in order to operate the cell in a pressurised modus, wherein particularly the cell efficiency can be increased.

The arrows as shown in the connection schemes of FIGS. 5 and 7 shall mainly illustrate thermal couplings, flow of fluid media and/or the thermal level of fluidic or procedural connections between the different elements of the plant 100. For further particulars it is referred to the according legend of symbols, indicating that the respective thermal "couplings" relate to an idle or "off"-mode, a temperature level of below 100° C., further temperature level of between 100 and 500° C., still further temperature level of between 500 and 800° C. and finally a temperature level of above 800° C.

Additionally, on the right side of FIG. 5, an according (coupled) steam cycle of the according power plant system 100 is shown. As introduced above, this cycle makes use of a steam turbine ST, expediently capable of conducting a so-called water steam cycle wsc.

As shown at the bottom of FIG. 5, a flue gas G of the gas turbine is fed to a (heat recovery) steam generator 8 of the steam turbine system ST. In a downward flow, the steam generator 8 produces, in turn, a flue gas G which may be discharged.

A steam St generated by the steam generator 8 is moreover provided to the steam turbine section 9 in order to produce an according output of mechanical or electrical power P.

At the downward end of the steam turbine section 9, accumulated water H2O may be provided to a condenser 10 and, then, via a (feed) water pump to the steam generator 8 in order to close the according cycle. Particularly the cycle as well as the implementation of the given plant system may correspond to the flow charts as shown in FIG. 4.

Figure 6:
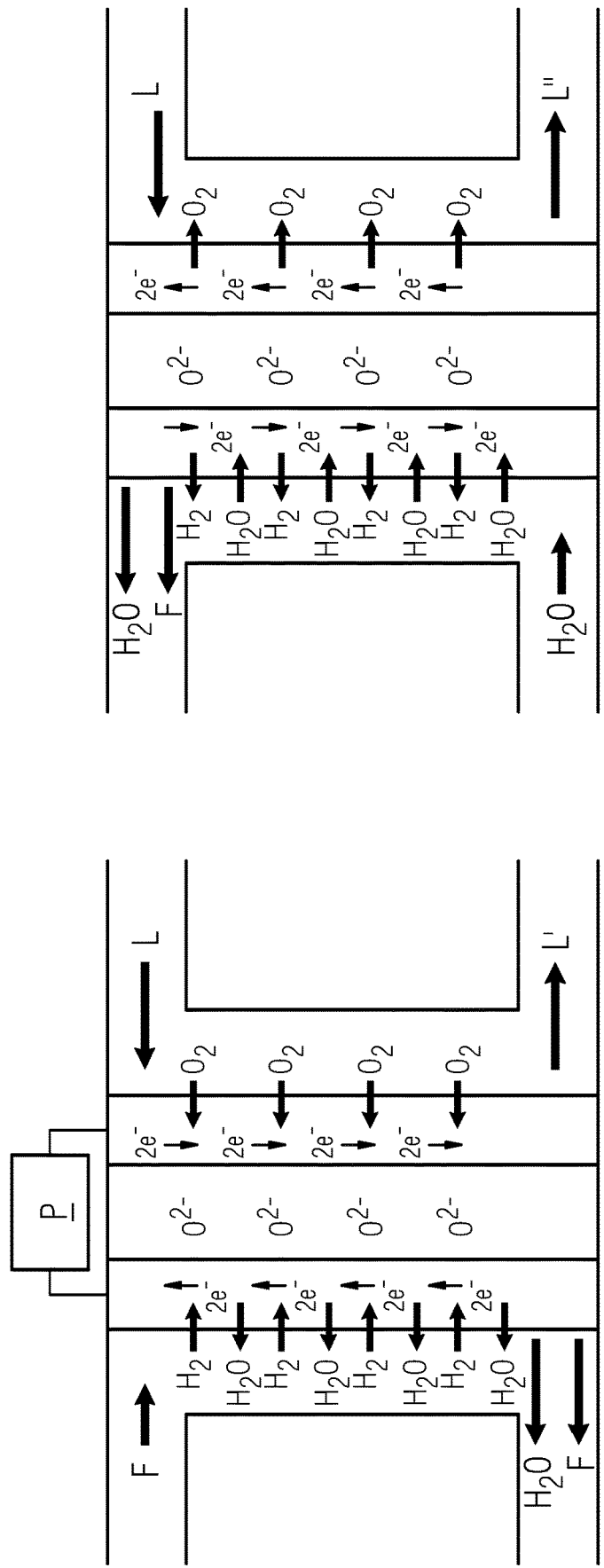
FIG. 6 schematically opposes a scheme of a solid oxide fuel cell in a load or cell mode (left) and an according solid oxide fuel cell in an electrolysis or regenerative mode (right).

FIG. 6 indicates on the left side substantially a device as already described by way of FIG. 1. On the right part of the picture, however, the function of an SOFC in the electrolysis or regenerative mode (SOEC) is opposed, wherein e.g. water, such as in the form of steam, is split into pure H2 (hydrogen) and O2 (Oxygen). In this modus, the SOFC cell may be referred to as a solid oxide electrolyzer cell (SOEC). In other words, the SOFC is a solid oxide fuel cell "hardware" run in the regenerative mode to achieve e.g. the electrolysis of water (and/or carbon dioxide) by using the solid oxide electrolyte E to produce hydrogen gas (and/or carbon monoxide) and oxygen.

When a voltage is applied to the device, water vapour moves to the electrolyte interface and is reduced to form pure H2 and oxygen ions. The hydrogen gas may then be collected at its surface as hydrogen fuel. In turn, the oxygen ions are conducted through the electrolyte E. At the other electrolyte interface, oxygen ions are oxidized to form pure oxygen gas or air L' with an increased portion of oxygen, which may be collected at the surface (on the right in FIG. 6).

Apparently, the production of pure hydrogen is required as it can be obtained as clean (green) fuel that can in turn constitute a storage medium, thus providing a potential alternative to batteries, which have in contrast a low storage capacity and create high amounts of waste material. Electrolysis is an advantageous method for hydrogen production from water due to the high efficiency of conversion and relatively low required energy input when compared to thermochemical and photocatalytic methods.

Solid oxide electrolyzer cells operate at temperatures which allow high-temperature electrolysis to occur, such as between 600° C. and 800° C. These operating temperatures are similar or at least close to those conditions at which an SOFC operates in the cell mode.

FIG. 7 indicates the plant system 100 as well as the according inventive method of operation, wherein the SOFC is operated in an SOEC, as described above. In contrast to the situation as shown in FIG. 5, the plant system 100 is operated such that the SOFC 1 operates in the regenerative (electrolysis) mode. In this situation, basic procedural principles as well apply as in the case in which the SOFC 1 has a regular cell operation. Particularly this mode advantageously allows for the depletion or consumption of excess grid energy (cf. P)—such as from renewable energy sources—to provide for the hydrogen and/or oxygen supply which may be further processed into fuels or other products, e.g. for chemical industry. Additionally, the SOFC may as well be operated in a pressurised mode such as when there's a fluidic connection to the charge air of the compressor 5 of the gas turbine GT.

Even though this embodiment may not be explicitly indicated in FIG. 7, the procedural circuitry of the fuel cell and an according use or depletion of excess grid energy may lead to an electrolysis or electrolytic reduction of water and/or carbon dioxide into hydrogen and a synthesis gas. Thereby a so-called Sabatier process can be applied as well, wherein methane may be generated from the synthesis gas. The loss heat from said Sabatier process may then be further used for thermal regulation of the fuel cell in an according electrolysis mode (cf. below).

In addition, or alternative to said Sabatier process, a so-called reverse water gas shift reaction (RWGS), like $CO_2+H_2 \rightarrow CH_4+CO+H_2O$, maybe applied. As an advantage thereof, carbon dioxide can be reduced or, in other words, carbon dioxide may be reformed with hydrogen to carbon monoxide and water.

FIG. 8 illustrates—analogue to FIG. 4 that—other than suggested in FIGS. 5 and 7—the present power plant system 100 may as well be set up without a combined steam cycle, i.e. in a simple cycle sc. An according energy conversion efficiency is schematically indicated, wherein only the SOFC in its fuel cell mode and a gas turbine GT are coupled. Besides the accumulated heat Q, it is apparent that an electrical power output P1 is yielded from the SOFC operation. As described above, P1 amounts roughly to half of the overall output power of the SOFC. As well, an output power P2 is yielded from the gas turbine GT operation, whereas the remainder is discharged as heat Q. When adding up P1 and P2 or as the case may be the underlying conversion efficiencies one obtains an overall efficiency of η (SOFC GT) of P1≈50%+P2≈12% which equals to around 63%.

Aside from a possible stationary operation, also a mobile application, as for instance in marine propulsion, wherein the generated fuels may be used to a larger extent, or in so-called auxiliary power units (APU), for marine and aeroflight applications, emergency power, sector coupling or others is possible by the supply of the according fuel as well as consumer appliances being based on the same technology.

The presented approach is generally broadly applicable due to the possibility of a modular architecture and exploitation of the possibility of the SOFC to be operated at partial loads.

The invention claimed is:

1. A power plant system, comprising:
a single solid oxide fuel cell and a gas turbine,
wherein the single solid oxide fuel cell and the gas turbine are set up such that compressed charge air of a compressor of the gas turbine is provided to the solid oxide fuel cell and/or an exhaust gas of the solid oxide fuel cell is provided to a combustion chamber of the gas turbine,
wherein the power plant system is configured such that the single solid oxide fuel cell is operated in a load or cell mode as well as in an electrolysis mode and wherein the single solid oxide fuel cell is set up such that an excess grid energy is used for executing an electrolysis in the electrolysis mode of the solid oxide fuel cell and thereby to chemically reduce water and/or carbon dioxide into hydrogen and/or syngas.

2. The power plant system as claimed in claim 1, further comprising:
a steam turbine being functionally coupled to the gas turbine such that a combined-cycle plant operation is facilitated.

3. A method of operating a power plant system as claimed in claim 1, comprising:
operating the solid oxide fuel cell in a load or a cell mode.

4. A method of operating a power plant system as claimed in claim 1, operating the solid oxide fuel cell in an electrolysis mode.

5. The method of operating a power plant system as claimed in claim 3, further comprising:
using an excess grid energy for executing an electrolysis in the electrolysis mode of the solid oxide fuel cell and thereby to chemically reduce water and/or carbon dioxide into hydrogen and syngas.

6. The method of operating a power plant system as claimed in claim 5, further comprising:
operating the solid oxide fuel cell in an ambient of compressed charge air being generated by the compressor of the gas turbine.

7. The method of operating a power plant system as claimed in claim 3, further comprising:
providing an exhaust gas of the solid oxide fuel cell still containing a fuel to the combustion chamber of the gas turbine.

8. The method of operating a power plant system as claimed in claim 4, further comprising:
applying a Sabatier reaction to the syngas in order to provide methane.

9. The method of operating a power plant system as claimed in claim 8, further comprising:
using waste heat from the Sabatier reaction for thermally regulating the solid oxide fuel cell.

* * * * *